United States Patent [19]
Fitzgerald

[11] Patent Number: 5,848,772
[45] Date of Patent: Dec. 15, 1998

[54] KITCHEN CUTTING BOARD STORAGE APPARATUS

[76] Inventor: Theodore L. Fitzgerald, 2660 Kemp Rd., Warrior, Ala. 35180

[21] Appl. No.: 582,185

[22] Filed: Jan. 2, 1996

[51] Int. Cl.⁶ .................................................. A47G 1/17
[52] U.S. Cl. .................... 248/205.3; 248/201; 248/206.5
[58] Field of Search .................. 248/205.3, 201, 248/241, 300, 683, 206.5, 309.1, 316.7, 316.8, 905; 211/86, 94.5; 40/658

[56] References Cited

U.S. PATENT DOCUMENTS

| | | |
|---|---|---|
| 3,168,275 | 2/1965 | Grondin ................................ 248/205.3 |
| 3,544,182 | 12/1970 | Tainter . |
| 4,049,332 | 9/1977 | Boudreaux . |
| 4,077,685 | 3/1978 | Scire et al. . |
| 4,300,692 | 11/1981 | Moren .................................. 248/205.3 |
| 4,369,948 | 1/1983 | Krause et al. . |
| 4,606,735 | 8/1986 | Wilder et al. ........................ 248/205.3 |
| 4,834,331 | 5/1989 | Domingo .............................. 248/205.3 |
| 4,909,158 | 3/1990 | Sorensen . |
| 5,031,975 | 7/1991 | Anderson . |

Primary Examiner—Ramon O. Ramirez
Assistant Examiner—Willie Berry, Jr.
Attorney, Agent, or Firm—Gerald M. Walsh

[57] ABSTRACT

This invention comprises a cutting board storage holder composed of plastic or metal having three brackets with top portions of each bracket having an adhesive means, wherein two of said brackets are placed on opposite sides of a cutting board and one of said brackets is placed on one end of a cutting board, whereby said cutting board holder can be installed in a concealed manner under a wall kitchen cabinet or under a shelf therein by pressing said cutting board, with brackets so placed, against an external bottom surface of the cabinet or shelf, thereby attaching said brackets to the surface, and whereby said brackets restrict lateral and linear movement of the cutting board as it is inserted for storage into said brackets of said holder.

3 Claims, 1 Drawing Sheet

KITCHEN CUTTING BOARD STORAGE APPARATUS

FIELD OF THE INVENTION

This invention relates to cutting boards in general and, more particularly, to a concealable cutting board storage apparatus providing rapid easy installation in a kitchen cabinet.

BACKGROUND OF THE INVENTION

Cutting boards of various kinds are well known for use in the household kitchen as well as within industrial settings. The usefulness of concealing cutting boards in a convenient location is also well known. Existing means for holding and concealing cutting boards are contained within kitchen cabinets, wherein the cutting boards are horizontally or vertically and slidably supported within a rectangular slot in the cabinet. These means of holding and concealing the cutting board form an integral part of the kitchen cabinet and must be installed at the time of the construction of the cabinet. Alternatively, expensive reconstruction of the cabinet is required for installation.

I have discovered that standard kitchen cutting boards are of such size and thickness that they can be concealed from view when placed on the bottom external surface of a wall kitchen cabinet because the bottom facia of the cabinet extends below this bottom external surface in most standard cabinets. The bottom external surface of kitchen cabinets has been used to mount devices such as paper towel holders, lights, book holders, and the like, but these are not concealed and there are no disclosures of means for containing cutting boards concealably and removably underneath kitchen cabinets providing easy installation that does not require tools.

Cutting boards constructed of plastic or wood need to have sufficient surface area and thickness to be useful. Consequently, the mass of the cutting board must be considered when constructing a holder which will suspend the cutting board from the bottom of a kitchen cabinet or from a shelf within the cabinet. Such holders would bear the entire weight of the cutting board so it is essential that the shape, surface area, and adhering means of the holder meet critical specifications. These difficulties are compounded when the holder is intended to be installable without tools, easily removable, and easily accessible for insertion and removal of the cutting board.

OBJECTS OF THE INVENTION

It is a particular objective of the present invention to so design a cutting board storage holder which will store a cutting board in a concealed fashion under a kitchen cabinet or under a shelf within a kitchen cabinet.

A further objective is to provide a concealable cutting board holder which is easy to install or remove without tools.

It is another objective of the present invention to provide a concealable cutting board holder of simple and inexpensive construction which allows easy storage and removal of the cutting board.

SUMMARY OF THE INVENTION

With the above and further objectives and advantages in view, and with the provision of an efficient concealable cutting board storage holder of simple and inexpensive construction, the invention comprises novel construction and adaptation and combination of parts hereinafter described and claimed. A preferred embodiment of this invention comprises three plastic "L" shaped brackets each with a top portion, a bottom portion, and a side portion. The top portion contains an adhesive means to fasten the top portion of the bracket to the bottom external surface of a kitchen cabinet or to the bottom surface of a shelf within the cabinet. The brackets are placed so that they support two opposite sides and one end of a cutting board. The brackets can be installed by placing them in position on the cutting board and then pressing the board, with brackets in place, on to the bottom external surface of the kitchen cabinet such that the adhesive means of the top portion of the brackets makes contact with the bottom external surface of the kitchen cabinet. The cutting board is inserted by placing the hand on the bottom side of the cutting board, placing the board between the two brackets that support the opposite sides of the cutting board, and advancing the board towards the bracket which supports one end of the cutting board. The advancing motion imparted to the cutting board is terminated when the cutting board meets the bracket which supports the end of the cutting board. The cutting board is easily removed by an opposite action. The board can be inserted from the left or from the right depending upon whether the bracket supporting the end of the cutting board is mounted to the user's left or right side.

BRIEF DESCRIPTION OF THE DRAWINGS

The details and advantages of this invention will become more apparent in the specifications, descriptions, and drawings, of which.

DETAILED DESCRIPTION OF THE PREFERRED EMBODIMENT

Figure 1:
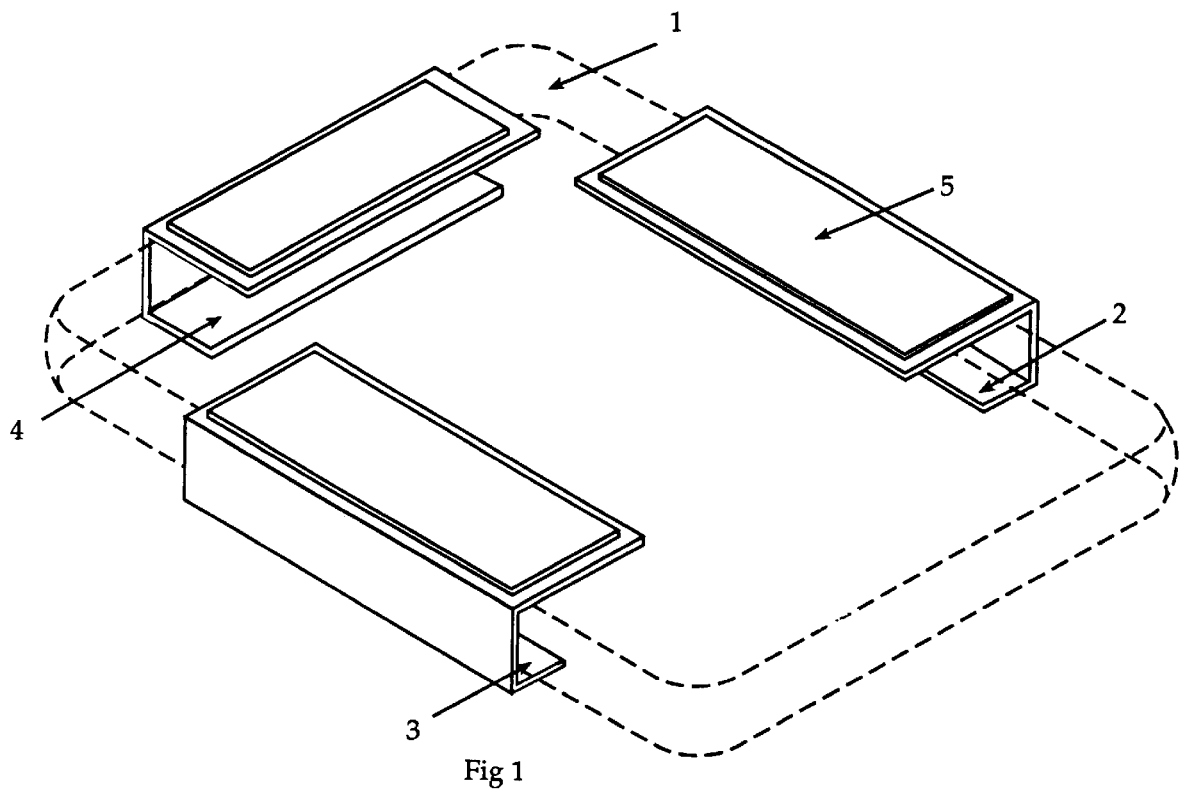
FIG. 1 is a perspective top view of the concealable cutting board storage holder with a cutting board in place.

FIG. 1 shows a perspective top view of the concealable cutting board storage holder, composed of brackets 2, and 3, and 4, with a cutting board 1 held in place by the brackets. Brackets 2 and 3 support the cutting board on opposite sides of the cutting board while bracket 4 supports one end of the cutting board. The brackets 2, 3, and 4 are "L" shaped, each with a top portion, a bottom portion, and a side portion. The top portion contains an adhesive means 5 for fastening the top portion of the bracket to the bottom external surface of a kitchen cabinet or to the bottom surface of a shelf within the cabinet. Although the brackets can assume a variety of shapes, the "L" shape fits the contour of most cutting boards.

Figure 2:
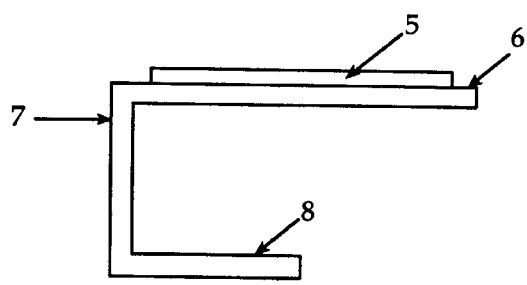
FIG. 2 is a side view of a concealable cutting board storage holder bracket.

FIG. 2 shows a side view of the brackets used to form the holder. The top portion 6 of the bracket contains an adhesive means 5 which fastens the bracket to a bottom external surface of a kitchen cabinet or to the bottom surface of a shelf within a cabinet. The side portion 7 of the bracket prevents lateral movement of the cutting board in the case of the brackets placed on the opposite sides of the cutting board and prevents linear movement in one direction in the case of the bracket placed on one end of the cutting board. The bottom portion 8 provides the support for holding the cutting board against the bottom external surface of the kitchen cabinet or the bottom surface of a shelf within the cabinet.

The brackets are composed of plastic or metal, preferably plastic composed of extruded polyvinyl chloride. The thickness of the plastic or metal ranges between 0.01 and 0.25 and inches, preferably 0.05 inches. The width of the top portion of the bracket ranges between 0.75 and 3 inches, preferably 1.5 inches. The width of the side portion of the bracket ranges between 0.25 and 1.5 inches, preferably 0.75 inches. The width of the bottom portion of the bracket ranges between 0.25 and 4 inches, preferably 0.75 inches. The length of the side brackets 2 and 3 ranges between 6 and 18 inches, preferably 10 inches. The length of the end bracket 4 ranges between 0.5 and 8 inches, preferably 2 inches. The adhesive means 5 can be composed of any standard adhesive, preferably a double-sided tape adhesive. One side of the adhesive means is attached to the top portion of the bracket.

The kitchen cutting board storage apparatus can be easily installed underneath a kitchen cabinet or under a shelf therein by first placing the side brackets on opposite sides of a cutting board and the end bracket on one end of the cutting board, each in a centered position. The brackets are so placed with the top portion of the brackets, containing the adhesive, facing upwards towards the external bottom surface of the kitchen cabinet or underside of a shelf within the cabinet. This assembly of the cutting board and brackets is then pressed toward the surface of the cabinet or shelf and pressure is applied manually to insure bonding of the top portion of the bracket to the surface. In order to insure adequate spacing between the side brackets and the cutting board and object such as a pencil can be placed between one of the side brackets and the cutting board which is then removed after installation.

The cutting board is easily inserted or removed from the holder. The cutting board is inserted by placing the hand on the bottom side of the cutting board, placing the board between the two brackets that support the opposite sides of the cutting board, and advancing the board towards the bracket which supports one end of the cutting board. The advancing motion imparted to the cutting board is terminated when the cutting board meets the bracket which supports the end of the cutting board. The cutting board is easily removed by an opposite action. The board can be inserted from the left or from the right depending upon whether the bracket supporting the end of the cutting board is mounted to the user's left or right side.

It is understood from the above description that the cutting board storage apparatus of the present invention can be used in other ways to hold and store a cutting board. For example, the holder can be placed vertically on a wall, door, or appliance, although not necessarily in a concealed fashion. Thus, there has been shown and described in detail preferred embodiments of this invention. However, it is apparent to one skilled in the art that this invention may incorporate other embodiments in many different forms. The present disclosure serves as an exemplification of the principles of the invention and is not intended to limit the invention to the embodiment illustrated. The scope of the invention is described in the appended claims.

What is claimed is:

1. A storage holder for a cutting board composed of plastic or metal comprising three brackets, each with a top, bottom, and side portion and each bracket shaped to fit the contour of said cutting board, said top portions having an adhesive means and said cutting board having two opposite sides and two opposite ends, wherein two of said brackets are placed on said opposite sides of said cutting board and one of said brackets is placed on one of said ends of said cutting board, whereby said cutting board holder can be installed in a concealed manner under a wall kitchen cabinet or under a shelf therein by pressing said cutting board, with brackets so placed, against an external bottom surface on said cabinet or said shelf and thereby attaching said brackets to said surface with said adhesive means, and whereby said side portions of brackets on said opposite sides of said cutting board restrict lateral movement and said side portion of bracket on said end of said cutting board restricts linear movement of said cutting board as it is inserted for storage into said brackets of said holder.

2. A cutting board storage holder according to claim 1 wherein the thickness of said plastic or metal ranges between 0.01 and 0.25 inches, the width of said top portion of said bracket ranges between 0.75 and 3 inches, the width of said side portion of said bracket ranges between 0.25 and 1.5 inches, the width of said bottom portion of said bracket ranges between 0.25 and 4 inches, the length of said brackets which provide support on said opposite sides of said cutting board ranges between 6 and 18 inches, the length of said bracket which provides support on said end of said cutting board ranges between 0.5 and 8 inches.

3. A cutting board storage holder according to claim 1 wherein the thickness of said plastic or metal is 0.05 inches, the width of said top portion of said bracket is 1.5 inches, the width of said side portion of said bracket is 0.75 inches, the width of said bottom portion of said bracket is 0.75 inches, the length of said brackets which provide support on said opposite sides of said cutting board is 10 inches, the length of said bracket which provides support on said end of said cutting board is 2 inches, and said adhesive means are composed of double-sided tape.

\* \* \* \* \*